US005785891A

United States Patent [19]
Lim

[11] Patent Number: 5,785,891
[45] Date of Patent: Jul. 28, 1998

[54] SPRAY FORMULATION FOR THE TESTING OF SMOKE DETECTORS

[75] Inventor: Walter Lim, Hacienda Hts, Calif.

[73] Assignee: Leon Cooper, Malibu, Calif.

[21] Appl. No.: 713,058

[22] Filed: Sep. 12, 1996

[51] Int. Cl.$^6$ ............................. C09K 3/30; G01M 19/00
[52] U.S. Cl. ...................... 252/305; 252/408.1; 340/628
[58] Field of Search ..................... 252/305, 408.1; 73/865.5; 427/255.6; 340/628

[56] References Cited

U.S. PATENT DOCUMENTS

| | | | |
|---|---|---|---|
| 3,929,492 | 12/1975 | Chapman et al. | 252/305 X |
| 4,301,674 | 11/1981 | Haines et al. | 252/305 X |
| 4,715,985 | 12/1987 | Pean et al. | 252/305 |
| 5,076,966 | 12/1991 | Marone | 252/408.1 |
| 5,139,699 | 8/1992 | Cooper et al. | 252/305 |
| 5,309,148 | 5/1994 | Birk | 252/305 X |

Primary Examiner—Richard D. Lovering
Attorney, Agent, or Firm—Natan Epstein

[57] ABSTRACT

An improved aerosol formulation for activating a smoke detector by emulating the effects of combustion products to test smoke detectors includes a propellant and an active ingredient consisting of phenyl trimethicone. An alcohol may be included for diluting the phenyl trimethicone to modify the aerosol particle size.

12 Claims, 1 Drawing Sheet

5,785,891

SPRAY FORMULATION FOR THE TESTING OF SMOKE DETECTORS

BACKGROUND OF THE INVENTION

1. Field of the Invention

The present invention relates generally to materials and compositions suited for simulating the effect of combustion products on electronic smoke detectors and more particularly relates to a new spray formulation for this purpose.

2. State of the Prior Art

Smoke detectors are commonplace fixtures in public buildings and private dwellings to protect lives and reduce property damage by providing early warning of fire. Numerous lives are lost through smoke inhalation every year before the actual fire has spread to the rooms occupied by the victims. A properly functioning smoke detector can alert the occupants of a dwelling to give them the time needed to safely exit the building. Fast response of the detector is of great importance since even one or two minutes may make the difference between a safe exit and loss of life in a typical home fire, due to the speed of propagation of the conflagration.

There are currently two basic types of smoke detectors. The ionization type senses changes in the electrical conductivity of the air in a chamber which is subject to radiation. The photoelectric type on the other hand senses light scattering in a detector chamber. Both devices respond to the presence of minute airborne particles of combustion byproducts which, when present in great quantities, are visible as smoke. However, in the earliest stages of a fire, these combustion byproducts take the form of an invisible aerosol, consisting of very fine particles suspended in air. It has been determined that such aerosols are generated at early stages of the fire, even before actual ignition, merely as a result of sufficient heating of combustible materials.

Detectors are typically provided with a "test" feature which is actuated by pressing a test button or pulling a switch mounted on the housing of the detector unit. Such "testing" however, is not a true operational test of the detector; it actually only verifies that power is supplied to the detector circuit and that the audible alarm does function. The test does not truly verify the responsiveness of the sensor element to the presence of smoke or combustion particles in the test chamber of the device. It is possible for a detector to respond as expected when the test button is pressed, while failing to respond to the presence of smoke. Smoke detectors of either type are susceptible to failure because the sensitivity of the electronic detector may deteriorate over time due to accumulation of dust, grease, corrosive fumes, moisture or other environmental contaminant. Aging of the electronic devices may contribute to such malfunctions. For these reasons, it is desirable to provide means by which a true operational test of the smoke detector can be carried out in a convenient manner.

Operational testing of smoke detectors is described in U.S. Pat. No. 4,301,674 issued to Haines et al., and has become widespread and routine in health, industrial and commercial installations. Hospitals, hotels, airports and many other large institutions contain large numbers of smoke detectors which, in the interest of public safety, require periodic testing.

The Haines '674 patent discloses a chemical formulation which, when discharged in aerosol form in the vicinity of a smoke detector, effectively emulates the presence of smoke particles. This earlier formulation was packaged in spray cans to allow easy, convenient and reliable operational testing of smoke detectors. Previous to the '674 patent, smoke detector testing was conducted either by actually generating smoke in the vicinity of the detector, or by enclosing the smoke detector in a housing to create an artificial environment into which was introduced an aerosol spray. The former approach was inconvenient and often dangerous while the latter was likewise inconvenient in that an enclosure had to be placed around the detector and furthermore, was less than a true operational test of the device in that the enclosure was often flooded with the trigger substance and consequently did not test the low level sensitivity of the device which is necessary to provide early warning of a fire.

That formulation of the Haines '674 patent included three ingredients: a) hydrocarbon propellant, b) isopropyl alcohol as a carrier medium and c) dioctyl phthalate, an ester of phthalic acid. The latter was dispersed from an aerosol can equipped with a finger operated dispensing valve to produce an aerosol effective for activating both photoelectric and ionization type smoke detectors.

Low cost aerosol dispensers discharge a substantial volume of coarse liquid particles along with the fine aerosol mist. For test purposes, it is the aerosol mist which is desirable and effective, while the coarse spray merely wets the detector unit. Further, the quantity of spray delivered is left to the discretion of the user. A short spray discharge will usually suffice, but because a small delay is usually inherent in the detector circuit users tend to continue spraying until the detector alarm goes off. Consequently, a considerable amount of the formulation is needlessly wasted, and builds up on the housing of the detector. While such wetting is not in itself detrimental to the proper operation of the smoke detector unit, dust and dirt may adhere to and accumulate on the wet housing, imparting an aesthetically unappealing appearance to the unit.

In U.S. Pat. No. 5,139,699 to Cooper et al. a spray formulation is disclosed which improves over the Haines '674 spray composition in that a smaller proportion of the phthalate active ingredient was employed, reducing the quantity of residue material deposited in the housing of the smoke detector unit as a result of the test procedure. Since the propellant dissipates rapidly and usually without significant residue, the reduction in the active ingredient results in reduced wetting.

The formulations disclosed in the Haines '674 and the Cooper '699 patents, are easily dispensed from a conventional hand held aerosol spray can, which makes this task relatively easy. These prior formulations however, are based on phthalate compounds, which are esters of phthalic acid, as the active ingredient. While these products and the formulations containing the same were effective for the intended purpose, phthalates are somewhat oily liquids which, when applied to the smoke detectors in grossly excessive quantities, as frequently happens when used by non-professionals, can leave an unattractive oily residue on the smoke detector.

Also, phthalates are known to react with certain plastics commonly used in the manufacture of various household articles, notably styrene plastic. Styrene is a bright, clear, low cost plastic transparent to light which is often used to make lamp shades in low cost fixtures. If a styrene surface is sprayed with the phthalate ingredient of the previously used formulation the surface becomes "crazed", a term used in the plastics industry to denote a type of damage where the transparency of a clear surface is etched away by a solvent.

Smoke detectors are mounted on ceilings or high on a wall, the same locations where such lamp fixtures are likely to be found. While this has not proven to be a significant drawback to use of the previous formulation, it is desirable to avoid even the small possibility of damage to household articles caused by careless or negligent application of the test spray.

The use of smoke detector test sprays is rapidly gaining acceptance as a consumer item for testing residential smoke detector installations by lay persons. In view of this development, a need exists for a spray formulation which is even more resistant to abusive application, and which is inert to plastics likely to be found in the immediate vicinity of smoke detectors.

SUMMARY OF THE INVENTION

This invention addresses the aforementioned concern by providing a new formulation capable of activating a smoke detector by emulating the full range of fire signals of combustion products when delivered to the smoke detector in aerosol form. The novel formulation, which is inert with regard to plastics, includes a propellant and an active ingredient, namely phenyl trimethicone, which is present in a proportion of approximately 1% to 10%.

The presently preferred propellant is a hydrocarbon propellant consisting of a propane and isobutane mixture, preferably admixed in approximately equal parts. The presently preferred formulation is of approximately 2% phenyl trimethicone with 98% propellant. The phenyl trimethicone may be in alcohol solution to adjust the size of the aerosol spray particles and their ballistic properties when ejected from the spray nozzle for improved directivity.

These and other advantages of the present invention will be better understood by reference to the detailed description of the preferred embodiments below.

DETAILED DESCRIPTION OF THE PREFERRED EMBODIMENT

Figure 1:
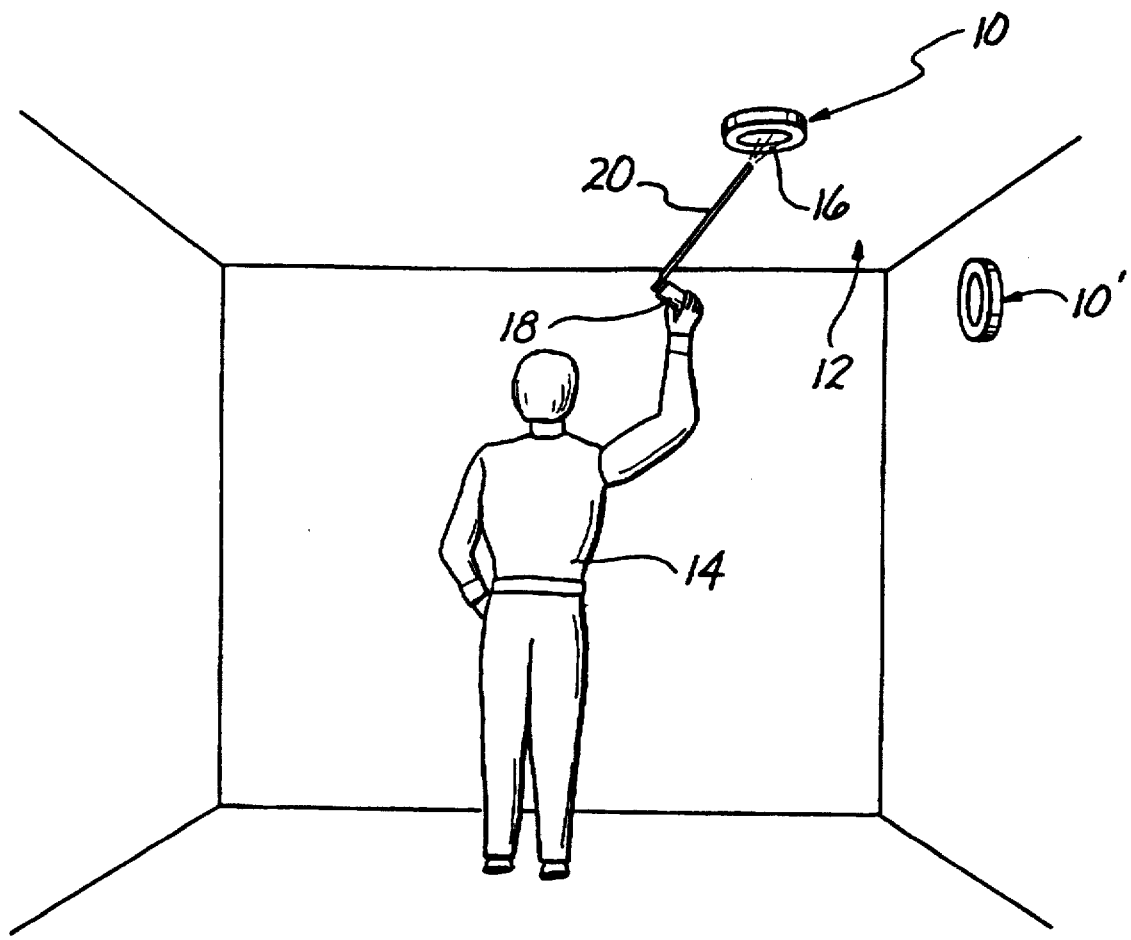
FIG. 1 is a perspective view of a typical room with a ceiling mounted smoke detector unit, illustrating delivery of the test formulation to the smoke detector.

Turning now to the attached drawings, FIG. 1 illustrates a typical room having a smoke detector 10 mounted on a ceiling 12, and for illustration, a smoke detector 10' mounted on a wall. A user 14 standing on the floor of the room is shown in the process of delivering an aerosol 16 of a smoke detector test formulation contained in an aerosol spray dispenser 18 with a finger actuated spray nozzle, held in and actuated by the user's hand. A typical user with his or her arm outstretched can hold the dispenser at a height of about six or seven feet, and the aerosol cloud can travel at least three additional feet from dispenser 18 to reach a ceiling mounted or wall mounted smoke detector up to a height of e.g. 10 feet. The spray dispenser 18 is shown fitted with a spray delivery system 20, disclosed in U.S. Pat. No. 5,361,623 to Wantz, designed to deliver true aerosol from the dispenser 18 to the detector while minimizing wetting of the detector by coarser droplets which are ineffective in activating the detector. The delivery system 20 is effective for further extending the reach of the user, to twelve or more feet.

A search was undertaken to identify materials which meet the following four requirements: non-toxicity to users and others, non-damaging to the planet's ozone layer, non-damaging to the detector's reliable operation, and having sufficient volatility to avoid undue residue build up on the smoke detector even when applied in somewhat excessive concentrations by untrained users.

Phenyl trimethicone was identified as having the first three of the above desired characteristics and was then tested for its effectiveness in reliably actuating smoke detectors and for residue left on the smoke detector's sprayed surfaces.

A formulation of approximately 2% phenyl trimethicone with 98% propellant was tested in a conventional aerosol spray dispenser of 2.5 ounce capacity, using a hydrocarbon propellant consisting of propane and isobutane mixed in approximately equal proportions.

Testing of the formulation for wetness or residue was conducted by delivering a measured squirt comparable to what would be delivered to a smoke detector for test purposes, to a mirror surface from measured distances between six inches and five feet. The test mirror surface was visually inspected following each spray discharge and subjectively judged for degree of wetting.

Comparative testing of the novel formulation against the prior formulation disclosed in the U.S. Pat. No. 5,139,699 patent yielded the results given below.

Operational Testing

Test I.

First, both the aerosol dispensers and the smoke detectors were temperature stabilized for 24 hours at 70–76 degrees F. The smoke detectors used were commercial units of known quality. Four different models were used, two ionization type and two photoelectric type detectors. The detectors were individually powered with a 24 volt D.C. power source coupled to the regular base provided with the detectors for normal installation. Each detector/base assembly was placed on a smooth plane surface to simulate a ceiling mounting of the unit. A two second spray discharge was directed at each detector from a distance of three feet. The spray discharge caused each of the detectors to go into alarm.

Test II.

A ionization type smoke detector was challenged with successive spray discharges with the following results:

| Distance | Duration | Alarm |
| --- | --- | --- |
| 3 feet | 2 seconds | Yes |
| 4 feet | 3 seconds | Yes |
| 5 feet | 3 seconds | No |

Similar testing of the prior spray formula yielded the same results.

Test III.

The same ionization type smoke detector was used, and the aerosol dispenser was fitted with the delivery system disclosed in U.S. Pat. Nos. 5,361,623, the delivery tube having a length of 18 inches. The outlet of the tube was held five feet away from the detector unit and a three second spray discharge was delivered, resulting in activation of the smoke detector alarm. The same test using the prior formulation produced the same result.

Test IV.

Tests II and III were repeated using a photoelectric type smoke detector. In every instance both the novel formulation as well as the prior formulation activated the alarm function of the smoke detector, including the five foot, three second spray discharge which failed to activate the ionization type smoke detector.

Evaporation Test.

A continuous seven second spray discharge was directed at a 90 degree angle and from a distance of only four inched at a single sheet of blue copy paper.

The novel formulation left a somewhat invisible ¾ inch circle of residue. When backlit with a 30 watt incandescent bulb located about 3.5 inches behind the paper sheet the spot created by the aerosol stood out as a more translucent clearly distinct spot. The prior formulation applied in the same manner yielded the same result.

To accelerate evaporation, each of the blue paper sheets which had been sprayed was then placed in an oven set at 275 degrees F. for a period of 30 minutes. The novel formulation faded to a condition where the original translucent spot was little more than a slight blemish on the paper. The spot produced by the prior formulation became more distinct and spread from its original ¾ inch size to approximately 1 inch in diameter.

The residue trace left by each of the formulae on the blue paper was then viewed against a 30 watt incandescent light bulb. The spot produced by the novel formula was not as bright as before the evaporation test. The spot produced by the prior formulation became more translucent as well as having spread in diameter as earlier mentioned.

Hazing tests.

A five second spray discharge was directed at a mirror from a distance of 6 inches. The prior formulation left a circular spray pattern about two inches in diameter. The deposit was sufficiently dense to cause relatively minor image distortion in the mirror surface.

The novel formulation, applied in the same manner, resulted in many small splatters on the mirror surface, but no distortion of the image.

The test was then repeated but from a distance of twelve inches. The prior formulation produced a barely discernible haze on the mirror surface. The novel formulation left no visible haze or deposit on the mirror.

Conclusions

From the foregoing test results, it is fair to conclude that the novel formulation disclosed-herein is at least equally effective as the prior formulation in activating the alarm function of both ionization type and photoelectric type smoke detectors by simulating the presence of combustion by-products. The novel formulation however is less prone to leave a wet residue on sprayed surfaces of the smoke detectors and to the extent that residue does result, it evaporates more readily that the applicant's prior formulation.

Another favorable characteristic of the new phenyl trimethicone ingredient is that it is a compound widely used in cosmetics and other personal care products such as shampoo and hair spray, has a known history as being environmentally benign and is not known to be a health risk to those coming into contact with it.

The size of aerosol particles produced by this formulation can be adjusted by dissolving the phenyl trimethicone in an alcohol. Undiluted phenyl trimethicone produces small aerosol particles which however emulate the kinds of smoke particles produced at the earliest stages of a fire. It is these particles which it is most desirable to detect as they provide early warning of a conflagration. The particle size increases with a greater proportion of alcohol, which makes the spray "wetter". This increases the mass of the individual particles and makes the spray more directional due to the increased momentum of the particles ejected from the aerosol spray nozzle. Alcohols suitable for this purpose include ethyl alcohol and isopropyl alcohol. Up to about thirty percent (30%) of the aerosol dispenser content may be alcohol added to about two percent (2%) phenyl trimethicone, the balance of the aerosol dispenser content being propellant. Other propellants than those specifically mentioned above may be used, including for example a mixture of butane, isobutane and propane, as well as Dimethyl ether, 152a and 134 although the latter is not economically desirable due to high cost.

While preferred embodiments of the invention have been described and illustrated for purposes of clarity and example, it must be understood that many changes, substitutions and modifications will become apparent to those possessed of ordinary skill in the art without thereby departing from the scope and spirit of the invention which is defined by the following claims.

What is claimed is:

1. A formulation for activating a smoke detector of either the ionization type or the photoelectric type by simulating the presence of combustion products when delivered in aerosol form from a hand held dispenser with a finger actuated spray nozzle, comprising:

a propellant; and phenyl trimethicone present in a proportion of between 10% and 1%.

2. The formulation of claim 1 wherein said propellant is a hydrocarbon propellant.

3. The formulation of claim 2 wherein said hydrocarbon propellant comprises a mixture of isobutane and propane.

4. The formulation of claim 3 wherein said isobutane and said propane are present in generally equal parts.

5. The formulation of claim 2 wherein said hydrocarbon propellant comprises a mixture of butane, isobutane and propane.

6. The formulation of claim 1 wherein said phenyl trimethicone is diluted in an alcohol.

7. The formulation of claim 6 wherein said alcohol is selected from the group consisting of ethyl alcohol and isopropyl alcohol.

8. The formulation of claim 6 wherein said alcohol comprises up to about 30% of said formulation.

9. The formulation of claim 6 wherein about 2% of said phenyl trimethicone is diluted in up to about 30% of said alcohol.

10. A formulation for delivery by means of a pressurized aerosol dispenser for testing functionality of electronic smoke detectors of either the photoelectric or ionization type, said formulation comprising approximately 2% phenyl trimethicone in a propellant comprised of one or more propellants selected from the group consisting of butane, isobutane and propane dimethyl ether, difluoroethane and $CHF_2CHF_2$.

11. The formulation of claim 10 wherein said formulation further comprises an alcohol for diluting said phenyl trimethicone thereby to modify the aerosol particle size delivered by the aerosol dispenser.

12. A formulation for delivery by means of a pressurized aerosol dispenser for testing functionality of electronic smoke detectors of either the photoelectric or ionization type, said formulation comprising up to 2% phenyl trimethicone diluted in up to 30% alcohol, the balance of said formulation being comprised of propellant.

* * * * *